United States Patent
Funaki et al.

(10) Patent No.: US 8,470,942 B2
(45) Date of Patent: Jun. 25, 2013

(54) METHOD FOR PRODUCING MELT-MOLDABLE TETRAFLUOROETHYLENE COPOLYMER

(75) Inventors: Atsushi Funaki, Chiyoda-ku (JP); Shigeki Kobayashi, Chiyoda-ku (JP); Hiroki Nagai, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 623 days.

(21) Appl. No.: 12/402,108

(22) Filed: Mar. 11, 2009

(65) Prior Publication Data

US 2009/0176952 A1 Jul. 9, 2009

Related U.S. Application Data

(63) Continuation of application No. PCT/JP2007/067236, filed on Sep. 4, 2007.

(30) Foreign Application Priority Data

Sep. 11, 2006 (JP) ................................ 2006-246041

(51) Int. Cl.
*C08F 16/24* (2006.01)

(52) U.S. Cl.
USPC ............ 526/206; 526/207; 526/247; 526/255

(58) Field of Classification Search
USPC .................................. 526/206, 207, 247, 255
See application file for complete search history.

(56) References Cited

U.S. PATENT DOCUMENTS

| | | | |
|---|---|---|---|
| 3,635,926 A | | 1/1972 | Gresham |
| 4,499,249 A * | | 2/1985 | Nakagawa et al. ............ 526/206 |
| 5,494,984 A * | | 2/1996 | Funaki et al. ................. 526/206 |
| 2002/0028895 A1* | | 3/2002 | Iwasaki et al. ................ 526/243 |
| 2003/0013791 A1* | | 1/2003 | Blong et al. .................. 524/379 |
| 2004/0214974 A1* | | 10/2004 | Aten .............................. 526/253 |
| 2008/0200627 A1 | | 8/2008 | Funaki et al. |

FOREIGN PATENT DOCUMENTS

| | | | |
|---|---|---|---|
| CN | 1765982 A | 5/2006 | |
| CN | 1774457 A | 5/2006 | |
| EP | 1698662 A1 * | 9/2006 | |
| JP | 62-285907 | 12/1987 | |
| JP | 5-320253 | 12/1993 | |
| JP | 7-179508 | 7/1995 | |
| JP | 7188346 A | 7/1995 | |
| JP | 9052955 A | 2/1997 | |
| JP | 10053624 A | 2/1998 | |
| JP | 2002003514 A | 1/2002 | |
| JP | 2002194008 A | 7/2002 | |
| JP | 2002317003 A | 10/2002 | |
| JP | 2003119204 A | 4/2003 | |
| JP | 2003-520863 | 7/2003 | |
| JP | 2003-523436 | 8/2003 | |
| JP | 2004231936 A | 8/2004 | |
| WO | WO 2007/074901 A1 | 7/2007 | |

OTHER PUBLICATIONS

Office Action issued Apr. 14, 2011 in corresponding Russian application No. 20091135520/04, filed Apr. 10, 2009.
Office Action issued Jan. 15, 2013, in Japanese patent application No. 2008-534298 (w/English translation).

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

The claimed invention relates to a method for producing a melt-moldable tetrafluoroethylene copolymer containing repeating units (a) based on tetrafluoroethylene and repeating units (b) based on another fluoromonomer, wherein the amount of the repeating units (a), based on the total mass of the repeating units (a) and the repeating units (b), is from 97.3 to 99.5 mass %, and the volume flow rate of the copolymer is from 0.1 to 1000 $mm^3/s$; the process including radical suspension-polymerization of tetrafluoroethylene and the fluoromonomer in an aqueous medium in the presence of a radical polymerization initiator and at least one chain transfer agent selected from the group consisting of methane, ethane, a hydrochlorocarbon, a hydrofluorocarbon and a hydrochlorofluorocarbon.

14 Claims, No Drawings

METHOD FOR PRODUCING MELT-MOLDABLE TETRAFLUOROETHYLENE COPOLYMER

TECHNICAL FIELD

The present invention relates to a method for producing a melt-moldable tetrafluoroethylene copolymer.

BACKGROUND ART

A polytetrafluoroethylene (hereinafter referred to as PTFE) is excellent in heat resistance, chemical resistance, weather resistance, a gas barrier property, etc. and used in various field, such as semiconductor industry and automobile industry. When commercially available PTFE is melted, its molten viscosity is so high that conventional melt molding cannot be carried out. Therefore, in order to mold PTFE, molding methods such as paste extrusion molding using a process aid, compression molding and ram extrusion have been employed. As a melt-moldable tetrafluoroethylene copolymer, a copolymer (hereinafter referred to as PFA) of tetrafluoroethylene (hereinafter referred to as TFE) with a perfluoro(alkyl vinyl ether) (hereinafter referred to as PAVE) has been known. In a case where PAVE is a perfluoro(propyl vinyl ether) (hereinafter referred to as PPVE), based on the total mass of repeating units based on TFE and repeating units based on PPVE in PFA, the content of repeating units based on TFE is from 94 to 97 mass %, and the content of repeating units based on PPVE is from about 3 to 6 mass %. Since production cost of PAVE is high, production cost of PFA is also high. Further, the melting point of PFA produced by copolymerizing PPVE is usually at most 310° C., and the heat resistance is low as compared to PTFE.

Recently, development of melt-moldable PTFE has been reported (for example, Patent Documents 1 and 2). This PTFE is considered to be a copolymer of TFE with a trace amount of another fluoromonomer. This PTFE has a higher melting point than PFA and thus is expected to be useful also under a higher temperature condition. Further, since the content of repeating units based on the fluoromonomer is less than the content of repeating units based on PAVE in PFA, it is considered that the production cost of the PTFE is lower than the production cost of PFA. However, in Patent Documents 1 and 2, the detail of the method for producing a melt-moldable PTFE is not described.

Usually, as the method for producing PTFE, a radical polymerization method is employed, and particularly a suspension polymerization method which uses no solvent or an emulsion polymerization method which uses a fluoroemulsifier is employed. On the other hand, as the method for producing PFA, a suspension polymerization method which uses a fluorine type solvent or an emulsion polymerization which uses a fluoroemulsifier is employed.

In the method for producing the above melt-moldable PTFE, it is considered that like the method for producing PFA, a suspension polymerization method which uses a fluorine type solvent or an emulsion polymerization method which uses a fluoroemulsifier may be used. However, in recent years, from the viewpoint of environmental protection, use of fluorine type solvents or fluoroemulsifiers tends to be restricted, and in the production of a melt-moldable PTFE, it is preferred to employ a suspension polymerization method using no fluorine type solvent.

However, it has been found that if a melt-moldable PTFE is produced by the suspension polymerization method using no fluorine type solvent, the molecular weight becomes too high, and a melt-moldable property tends to be lost. Therefore, it is conceivable that at the time of producing the melt-moldable PTFE, a chain transfer agent is added in order to control the molecular weight of the melt-moldable PTFE. However, it has been found that if as the chain transfer agent, an alcohol such as methanol as used for PFA or hexane is used, the polymerization rate becomes low, and thereby mechanical properties such as tensile strength of the melt-moldable PTFE deteriorate, and coloration occurs.

Patent Document 1: JP-A-2003-523436
Patent Document 2: JP-A-2003-520863

DISCLOSURE OF THE INVENTION

Object to be Accomplished by the Invention

It is an object of the present invention to produce a melt-moldable tetrafluoroethylene copolymer (hereinafter referred to as TFE copolymer) which is excellent in mechanical properties and free from coloration, with a preferable polymerization rate.

Means to Accomplish the Object

The present inventors have extensively studied in order to accomplish the above object, and as a result, found that in radical suspension-polymerization of TFE and another fluoromonomer in an aqueous medium with a radical polymerization initiator, a melt-moldable TFE copolymer can be produced by using a specific chain transfer agent. Thus, the present invention has been accomplished.

Namely, the present invention provides the method for producing a melt-moldable TFE copolymer having the following constructions.

(1) A method for producing a melt-moldable TFE copolymer, characterized by radical suspension-polymerizing TFE and another fluoromonomer in an aqueous medium in the presence of a radical polymerization initiator and at least one chain transfer agent selected from the group consisting of methane, ethane, a hydrochlorocarbon, a hydrofluorocarbon and a hydrochlorofluorocarbon, to produce a TFE copolymer comprising repeating units (a) based on TFE and repeating units (b) based on another fluoromonomer, wherein the amount of the repeating units (a) is from 97.3 to 99.5 mass % based on the total mass of the repeating units (a) and the repeating units (b), and the volume flow rate is from 0.1 to 1000 mm³/s.

(2) The method for producing a melt-moldable TFE copolymer according to the above (1), wherein the amount of the repeating units (a) is from 98 to 99.5 mass % based on the total mass of the repeating units (a) and the repeating units (b).

(3) The method for producing a melt-moldable TFE copolymer according to the above (1) or (2), wherein the melting point of the TFE copolymer is from 320 to 335° C.

(4) The method for producing a melt-moldable TFE copolymer according to any one of the above (1) to (3), wherein said another fluoromonomer is a perfluoro(alkylvinyl ether).

(5) The method for producing a melt-moldable TFE copolymer according to any one of above (1) to (4), wherein said another fluoromonomer is a perfluoro(propylvinyl ether).

(6) The method for producing a melt-moldable TFE copolymer according to any one of above (1) to (5), wherein the chain transfer agent is a compound represented by the following formula (I):

$$C_nH_mCl_pF_{2n+2-m-p} \qquad (1)$$

where n is an integer of 1 to 3, m is an integer of 1 to 6, p is 0 or an integer of 1 to 7, $m \leq 2n+2$, and $p \leq 2n+2-m$.

(7) The method for producing a melt-moldable TFE copolymer according to any one of above (1) to (6), wherein the chain transfer agent is dichloromethane, chlorodifluoromethane or ethane.

(8) The method for producing a melt-moldable TFE copolymer according to any one of above (1) to (7), wherein the amount of the chain transfer agent to be charged is from 0.0001 to 1 in the molar ratio, based on the total monomers charged at the initiation of the polymerization.

(9) The method for producing a melt-moldable TFE copolymer according to any one of above (1) to (8), wherein the radical polymerization initiator is a water-soluble radical polymerization initiator.

(10) The method for producing a melt-moldable TFE copolymer according to above (3), wherein the water-soluble radical polymerization initiator is ammonium persulfate.

(11) The method for producing a melt-moldable TFE copolymer according to any one of above (1) to (10), wherein tetrafluoroethylene and another fluoromonomer are radical suspension-polymerized in an aqueous medium in the presence of the radical polymerization initiator and the chain transfer agent and in addition, in the presence of from 3 to 80 ppm of a fluoroemulsifier based on the mass of the aqueous medium.

(12) The method for producing a melt-moldable TFE copolymer according to above (11), wherein the fluoroemulsifier is ammonium perfluorooctanoate, ammonium perfluorohexanoate or $F(CF_2)_2OCF_2CF_2OCF_2COONH_4$.

(13) The method for producing a melt-moldable TFE copolymer according to any one of above (1) to (12), wherein said another fluoromonomer is charged all at once at the initiation of the polymerization, and the tetrafluoroethylene and said another fluoromonomer are radical suspension-polymerized.

(14) The method for producing a melt-moldable TFE copolymer according to any one of above (1) to (13), wherein the amount of said another fluoromonomer to be used and present in the polymerization system at the initiation of the polymerization is from 1 to 6 mass % based on the tetrafluoroethylene copolymer to be formed.

Effects of the Invention

By the production method of the present invention, a melt-moldable TFE copolymer can be produced at an excellent polymerization rate, which has a high melting point and excellent mechanical properties such as tensile strength and is free from coloration. Further, when a trace amount of a fluoroemulsifier is used in the production method of the present invention, the rate of the suspension polymerization increases, and the reaction percentage of another fluoromonomer improves.

BEST MODE FOR CARRYING OUT THE INVENTION

In the production method of the present invention, starting material monomers are TFE and another fluoromonomer. Another fluoromonomer may, for example, be vinyl fluoride, vinylidene fluoride (hereinafter referred to as VdF), trifluoroethylene, hexafluoropropylene (hereinafter referred to as HFP), a perfluoro(alkyl vinyl ether) represented by $CF_2=CFOR^{f1}$ (here, $R^{f1}$ is a $C_{1-10}$ perfluoroalkyl group which may contain an oxygen atom between carbon atoms), $CF_2=CFOR^{f2}SO_2X^1$ (here, $R^{f2}$ is a $C_{1-10}$ perfluoroalkylene group which may contain an oxygen atom between carbon atoms, and $X^1$ is a halogen atom or a hydroxyl group), $CF_2=CFOR^{f2}CO_2X^2$ (here, $R^{f2}$ is as defined above, and $X^2$ is a hydrogen atom or a $C_{1-3}$ alkyl group), $CF_2=CF(CF_2)_pOCF=CF_2$ (here, p is 1 or 2), $CH_2=CX^3(CF_2)_qX^4$ (here, $X^3$ and $X^4$ which are independent of each other, is a hydrogen atom or a fluorine atom, and q is an integer of from 2 to 10), perfluoro(2-methylene-4-methyl-1,3-dioxolane), perfluoro(2,2-dimethyl-1,3-dioxole), perfluoro(4-methyl-1,3-dioxole) or perfluoro(4-methoxy-1,3-dioxole). As another fluoromonomer, one fluoromonomer may be used alone, or two or more fluoromonomers may be used in combination.

Another fluoromonomer is preferably at least one member selected from the group consisting of HFP, $CF_2=CF(CF_2)_pOCF=CF_2$, $CF_2=CFOR^{f1}$ and $CH_2=CX^3(CF_2)_qX^4$.

As $CF_2=CF(CF_2)_pOCF=CF_2$, $CF_2=CFCF_2OCF=CF_2$ or $CF_2=CF(CF_2)_2OCF=CF_2$ may, for example, be mentioned.

As a perfluoro(alkyl vinyl ether) represented by $CF_2=CFOR^{f1}$, $CF_2=CFOCF_3$, $CF_2=CFOCF_2CF_3$, $CF_2=CFOCF_2CF_2CF_3$, $CF_2=CFOCF_2CF_2CF_2CF_3$, $CF_2=CFO(CF_2)_8F$, $CF_2=CFOCF_2CF(CF_3)OCF_2CF_2CF_3$, $CF_2=CFOCF_2OCF_2CF_3$ or $CF_2=CFOCF_2OCF_2CF_2CF_3$ may, for example, be mentioned. It is preferably $CF_2=CFOCF_2CF_3$ or $CF_2=CFOCF_2CF_2CF_3$, more preferably $CF_2=CFOCF_2CF_2CF_3$.

As $CH_2=CX^3(CF_2)_qX^4$, $CH_2=CH(CF_2)_2F$, $CH_2=CH(F_2)_3F$, $CH_2=CH(CF_2)_4F$, $CH_2=CF(CF_2)_3H$ or $CH_2=CF(CF_2)_4H$ may, for example, be mentioned. It is preferably $CH_2=CH(CF_2)_4F$ or $CH_2=CH(CF_2)_2F$.

Another fluoromonomer is preferably a perfluoro(alkyl vinyl ether), more preferably a perfluoro(propyl vinyl ether).

The amounts of starting material monomers i.e. TFE and another fluoromonomer are optionally selected so that the composition of the TFE copolymer to be obtained can be melt-molded. The amount of another monomer present in the polymerization system is preferably from 1 to 6 mass %, more preferably from 1 to 5 mass %, most preferably from 1 to 4 mass %, based on the mass of the TFE copolymer to be formed.

In the method of the present invention for producing a melt-moldable TFE copolymer, a TFE copolymer is produced by copolymerizing TFE and another fluoromonomer by a radical suspension-polymerizing method in an aqueous medium in the presence of a radical polymerization initiator and a chain transfer agent.

The radical suspension-polymerizing method is a method for carrying out radical polymerization in an aqueous medium in a state of suspension, and the aqueous medium may, for example, be deionized water or ultrapure water. As the case requires, an appropriate organic solvent may be added to the aqueous medium.

The appropriate organic solvent may, for example, be a perfluorocarbon such as perfluorohexane or perfluorocyclobutane, a hydrofluorocarbon such as $CHF_2CF_2CF_2CF_2CF_2CF_3$, a hydrochlorofluorocarbon such as $CFHClCF_2CF_2Cl$ or a hydrofluoroether such as $CH_3OCF_2CF_3$, $CH_3OCF_2CF_2CF_3$ or $CF_3CH_2OCF_2CF_2H$.

When the organic solvent is added to the aqueous medium, the ratio of the organic solvent/the aqueous medium is from 5/95 to 90/10, preferably from 10/90 to 70/30, most preferably from 20/80 to 50/50 in the mass ratio.

As the production method of the present invention, a suspension polymerization which only uses an aqueous medium without using an organic solvent is particularly preferred from the viewpoint of environmental protection.

As the radical polymerization initiator, a radical polymerization initiator of which half-life is ten hours at a temperature of from 0° C. to 100° C. (hereinafter referred to as ten hour half-life temperature) is preferred. The ten hour half-life temperature is more preferably from 20° C. to 90° C. The radical polymerization initiator may be an oil soluble radical polymerization initiator or a water-soluble radical polymerization initiator, however, the water-soluble radical polymerization initiator is preferred. When the water-soluble radical polymerization initiator is used, the radical suspension-polymerization can be carried out by using only an aqueous medium.

The oil soluble radical polymerization initiator may, for example, be an azo compound such as azobisisobutylonitrile, a non-fluorine type diacyl peroxide such as isobutylyl peroxide, octanoyl peroxide, benzoyl peroxide, lauroyl peroxide or disuccinic acid peroxide; a peroxydicarbonate such as diisopropyl peroxydicarbonate or di-n-propylperoxydicarbonate; a peroxyester such as tert-butylperoxypivalate, tert-butylperoxyisobutylate or tert-butylperoxyacetate or fluordiacylperoxide such as a compound represented by $(Z(CF_2)_rCOO)_2$ (here, Z is a hydrogen atom, a fluorine atom or a chlorine atom, and r is an integer of from 1 to 10).

Further, the a water-soluble radical polymerization initiator may, for example, be a carboxylic acid peroxide such as disuccinic acid peroxide or an inorganic peroxide such as potassium persulfate, sodium persulfate or ammonium persulfate. In a case where the suspension polymerization is carried out by using only a water-soluble medium without using an organic solvent, the inorganic peroxide such as potassium persulfate, sodium persulfate or ammonium persulfate is preferred.

The amount of the radical polymerization initiator to be charged is preferably from 10 to 2,000 ppm, more preferably from 20 to 1,000 ppm, particularly preferably from 50 to 500 ppm, based on the mass of the charged aqueous medium.

In the production method of the present invention, is the polymerization condition is not particularly restricted and optionally selected, however, the polymerization temperature is preferably from 0 to 100° C., more preferably from 20 to 90° C., most preferably from 50 to 80° C. The polymerization pressure is preferably from 0.1 to 5 MPa, more preferably from 0.5 to 2 MPa.

In the production method of the present invention, in order to control the volume flow rate of the melt-moldable TFE copolymer, a chain transfer agent is used. The chain transfer agent is at least one selected from the group consisting of methane, ethane, a hydrochlorocarbon, a hydrofluorocarbon and hydrochlorofluorocarbon. The hydrochlorocarbon may, for example, be dichloromethane or trichloromethane. The hydrofluorocarbon may, for example, be fluoromethane, difluoromethane, 1,1-difluoroethane or 1,1,1-trifluoroethane. The hydrochlorofluorocarbon may, for example, be chlorodifluoromethane, dichlorofluoromethane, 1,1-dichloro-1-fluoroethane or 1-chloro-1,2,2,2-tetrafluoroethane.

The chain transfer agent is preferably a compound represented by the following formula (I).

$$C_nH_mCl_pF_{2n+2-m-p} \qquad (1)$$

where n is an integer of 1 to 3, m is an integer of 1 to 6, p is 0 or an integer of 1 to 7, m≦2n+2, and p≦2n+2-m.

In the above formula, n is more preferably from 1 to 2, and m is more preferably from 2 to 6. Ethane (n=2, m=6 and p=0), dichloromethane(n=1, m=2 and p=2) and chlorodifluoromethane(n=1, m=1 and p=1) are most preferred.

When such a chain transfer agent is used, the polymerization rate of TFE with another fluoromonomer is excellent, and the melt-moldable TFE copolymer thereby obtained is excellent in mechanical properties such as tensile strength and free from coloration.

The amount of the chain transfer agent to be charged is preferably from 0.0001 to 1, more preferably from 0.0005 to 0.5, particularly preferably from 0.01 to 0.1, in a molar ratio based on the total monomers charged at the time of the initiation of the polymerization.

In the production method of the present invention, it is preferred that tetrafluoroethylene and another fluoromonomer are radical suspension-polymerized in the aqueous medium in the presence of the radical polymerization initiator and the chain transfer agent and in addition in the presence of from 3 to 80 ppm of a fluoroemulsifier, based on the mass of the aqueous medium.

The fluoroemulsifier is preferably a fluoroalkyl carboxylate such as ammonium perfluorooctanoate, sodium perfluorooctanoate, ammonium perfluorohexanoate or sodium perfluorohexanoate or a fluoroemulsifier represented by the formula $F(CF_2)_nO(CF(X)CF_2O)_mCF(X)COOA$ (in the formula, X is a fluorine atom or a $C_{1-3}$ perfluoroalkyl group, A is a hydrogen atom, an alkali metal or $NH_4$, n is an integer of from 1 to 10, m is 0 or an integer of from 1 to 3).

The emulsifier represented by $F(CF_2)_nO(CF(X)CF_2O)_mCF(X)COOA$ may, for example, be $F(CF_2)_2OCF_2CF_2OCF_2COONH_4$, $F(CF_2)_3OCF(CF_3)CF_2OCF(CF_3)COONH_4$, $F(CF_2)_3O(CF(CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_2OCF_2CF_2OCF_2COONa$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$, $F(CF_2)_4O(CF_2CF_2O)_2CF_2COONa$, $F(CF_2)_3OCF(CF_3)CF_2OCF(CF_3)COONa$ or $F(CF_2)_3O(CF(CF_3)CF_2O)_2CF(CF_3)COONa$.

The fluoroemulsifier is preferably ammonium perfluorooctanoate, ammonium perfluorohexanoate, $F(CF_2)_2OCF_2CF_2OCF_2COONH_4$, $F(CF_2)_3OCF_2CF_2OCF_2COONH_4$ or $F(CF_2)_4OCF_2CF_2OCF_2COONH_4$, most preferably ammonium perfluorooctanoate, ammonium perfluorohexanoate or $F(CF_2)_2OCF_2CF_2OCF_2COONH_4$.

The content of the fluoroemulsifier is preferably from 5 ppm to 50 ppm, most preferably from 10 to less than 30 ppm, based on the mass of the aqueous medium. The above content of the fluoroemulsifier is remarkably less than the content of from 1,000 to 5,000 ppm, which is the amount of the fluoroemulsifier used for producing PTFE or PFA by emulsion polymerization.

When a trace amount of the fluoroemulsifier is used like in the above range, the rate of the suspension polymerization increases, and the reaction percentage of another fluoromonomer improves. This is considered to be attributable to an increase in the affinity of TFE and the fluoromonomer.

The concentration of the TFE copolymer in a suspension polymerization liquid obtained by the production method of the present invention can be optionally selected, however, usually, it is preferably from 3 to 40 mass %, more preferably from 5 to 35 mass %, particularly preferably from 7 to 30 mass %.

In the production method of the present invention, it is particularly preferred that TFE and another fluoromonomer are radical suspension-polymerized by charging said another fluoromonomer all at once at the initiation of the polymerization in the presence of the radical polymerization initiator, the chain transfer agent and the aqueous medium. In the production method of the present invention, it is more preferred that TFE and another fluoromonomer are radical suspension-polymerized by charging said another fluoromonomer all at once at the initiation of the polymerization in the presence of the radical polymerization initiator, the chain transfer agent and the aqueous medium, and in addition, in the presence of from 3 to 80 ppm of a fluoroemulsifier based on the mass of the aqueous medium.

The melt-moldable TFE copolymer obtained by the production method of the present invention comprises the repeating units (a) based on TFE and the repeating units (b) based on another fluoromonomer. Based on the total mass of the repeating units (a) and the repeating units (b), the amount of the repeating units (a) is from 97.3 to 99.5 mass %, preferably from 97.6 to 99.5 mass %, more preferably from 98 to 99.5 mass %, most preferably from 98 to 99.3 mass %. Further, the amount of the repeating units (b) based on another fluoromonomer is from 0.5 to 2.7 mass %, preferably from 0.5 to 2.4 mass %, more preferably from 0.5 to 2.0 mass %, most preferably from 0.7 to 2 mass %. When the amount of the repeating units (a) is within the above range, the TFE copolymer can be melt-molded, is excellent in the mechanical properties, has a high melting point and is excellent in the heat resistance.

Further, the melt-moldable TFE copolymer obtained by the production method of the present invention has a volume flow rate (hereinafter referred to as Q value) of from 0.1 to 1,000 mm$^3$/sec, preferably from 0.2 to 100 mm$^3$/sec, more preferably from 0.5 to 50 mm$^3$/sec. The Q value is an index representing the molten flow property of the TFE copolymer and an indicator of the molecular weight. When the Q value is high, the molecular weight is low, and when the Q value is low, the molecular weight is high. In the present invention, the Q value is an extrusion velocity of the TFE copolymer, when the TFE copolymer is extruded into an orifice having a diameter of 2.1 mm and a length of 8 mm under a load of 7 kg at a temperature higher by 50° C. than the melting point of the TFE copolymer by using a flow tester manufactured by Shimadzu Corporation. If the Q value is too small, it is difficult to carry out the extrusion molding, and if the Q value is too large, the mechanical strength of the TFE copolymer deteriorates. When the Q value is within the above range, the TFE copolymer can be melt-molded and is excellent in the mechanical properties.

The melting point of the melt-moldable TFE copolymer obtained by the present invention is preferably from 320° C. to 335° C., more preferably from 323° C. to 330° C., most preferably from 325° C. to 330° C. When the melting point is within the above range, the melt-moldable TFE copolymer is excellent in the heat resistance and in its applicability to an application at a high temperature.

The TFE copolymer obtained by radical suspension-polymerizing TFE and another fluoromonomer by charging another fluoromonomer all at once at the initiation of the polymerization as mentioned above is particularly preferred, since such a TFE copolymer is melt-moldable, and has a high melting point of from 325° C. to 330° C. and is excellent in the heat resistance.

The reason why the TFE copolymer obtained by radical suspension-polymerizing TFE and another fluoromonomer by charging another fluoromonomer all at once at the initiation of the polymerization is melt-moldable, has a high melting point of from 325° C. to 330° C. and is excellent in the heat resistance, is not necessarily clear, but is considered to be as follows. The present radical suspension-polymerization is characterized by charging a trace amount of another monomer (such as PPVE) at a level of from 1 to 6 mass % based on the polymer to be formed, all at once at the initiation of the polymerization and copolymerizing TFE and another monomer. By this method, the concentration of another monomer present in the system at the end of the polymerization becomes low, and the content of the repeating units based on another monomer in the TFE copolymer thereby formed also becomes low. Namely, it is considered that at the end of the polymerization, a TFE copolymer of which the content of the repeating units based on TFE is high and the heat resistance is high is formed at an outer shell of suspended particles of the TFE copolymer, and the TFE copolymer thereby has a high melting point. Further, in the production of PFA, which is a copolymer of TFE and PPVE, a suspension polymerization method using a fluorine type solvent or an emulsion polymerization method using a fluoroemulsifier is employed. In order to make the composition of PPVE be constant, a method of continuously adding PPVE during the polymerization and a method of charging a large amount of PPVE at a level of 10 mass % of the yield of PFA at once at the initiation of the polymerization are known. In such methods for producing PFA the concentration of PPVE is high until the end of the polymerization. Therefore, the method of the present invention for producing a TFE copolymer is clearly different from such methods for producing PFA in the polymerization method and in the concentration of PPVE.

The melt-moldable TFE copolymer obtained by the production method of the present invention is preferably formed in a pellet form by using an extruder. As the extruder, a single screw or double screw extruder is usually used. The temperature of the extruder is preferably from 340 to 400° C. at a metering zone or a die region. Further, the rotational speed of the screw is preferably from about 5 to 100 rpm.

In a case where an unstable terminal group is contained in the melt-moldable TFE copolymer, post-treatment such as heat treatment, molten shearing treatment or fluorination treatment may be carried out in order to stabilize the unstable terminal group.

The melt-moldable TFE copolymer may be molded alone. Furthermore, it is also preferred that the TFE copolymer is molded as a composition in which various ingredients are blended. The ingredients may, for example, be carbon black for imparting conductivity, carbon fiber for improving the mechanical strength, pigments, etc.

The melt-moldable TFE copolymer can be molded by various methods such as injection molding, compression molding, extrusion molding, transfer molding or blow molding. The injection molding method is more preferred.

EXAMPLES

Now, the present invention will be described in further detail with reference to Examples. However, the present invention is by no means restricted thereto. Further, the copolymer composition of the TFE copolymer was measured by $^{19}$F-NMR in a thermally molten state of the TFE copolymer in accordance with Asahi Glass Research Report, 1990, 40(1), 75.

The reaction percentage of $CF_2$=$CFO(CF_2)_3F$(PPVE) was obtained as the proportion (mass %) of the mass of copolymerized $CF_2$=$CFO(CF_2)_3F$ to the mass of charged PPVE which was calculated from the copolymer composition of the TFE copolymer.

The tensile strength and the tensile elongation were obtained in accordance with ASTM D3307 by measuring the strength and elongation at the time of break by the tensile test at 50 mm/min of a test specimen obtained by punching a sheet having a thickness of 1 mm formed by press molding a TFE copolymer, by a micro dumbbell.

For the melting point, about 10 mg of a TFE copolymer obtained by drying after the polymerization was heated at 10° C./min by a differential calorimeter (SSC/5200-TG/

DTA220U, manufactured by Seiko Instruments Inc.), the heat absorption peak top was taken as the melting point.

The Q value is an extrusion velocity of a TFE copolymer, when the TFE copolymer is extruded into an orifice having a diameter of 2.1 mm and a length of 8 mm at a temperature higher by 50° C. than the melting point of the TFE copolymer, under a load of 7 kg by using a flow tester manufactured by Shimadzu Corporation.

Example 1

A polymerization reactor equipped with a stirrer and having an internal capacity of 1.3 liters, was deaerated, and 780 g of desalted water, 4.1 g of PPVE, 0.65 g of ammonium carbonate and 0.8 g of dichloromethane were charged. Then, the interior of the polymerization reactor was heated to 70° C., and TFE was introduced until the pressure of the polymerization reactor became 1.0 MPa/G. 16 cm$^3$ of a 1 mass % aqueous solution of ammonium persulfate was charged as the polymerization initiator solution to initiate the polymerization. TFE was continuously charged to keep the pressure to be 1.0 MPa/G during the polymerization. After 5.0 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 127.3 g of a TFE copolymer 1 was obtained. The polymer composition was is such that repeating units based on TFE/repeating units based on PPVE/=99.8/1.2 (mass %). The melting point was 327° C., and the Q value was 2.8 mm$^3$/s. By press-molding the copolymer at 340° C., a white sheet having a thickness of 1 mm was obtained. The tensile strength of the TFE copolymer 1 was 23.7 MPa, and the tensile elongation was 319%.

Example 2

The polymerization reactor used in Example 1 was deaerated, and 780 g of desalted water, 4.1 g of PPVE and 0.65 g of ammonium carbonate were charged. Then, the interior of the polymerization reactor was heated to 70° C. Ethane was introduced until the pressure became 0.03 MPa/G, and then TFE was introduced until the pressure of the polymerization reactor became 1.0 MPa/G. 16 cm$^3$ of a 1 mass % aqueous solution of ammonium persulfate was charged as the polymerization initiator solution to initiate the polymerization. TFE was continuously charged to keep the pressure to be 1.0 MPa/G during the polymerization. After 4.8 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 120.4 g of a TFE copolymer 2 was obtained. The polymer composition was such that repeating units based on TFE/repeating units based on PPVE=98.6/1.4 (mass %). The melting point was 324° C., and the Q value was 2.4 mm$^3$/s. By press-molding the copolymer at 340° C., a white sheet having a thickness of 1 mm was obtained. The tensile strength of the TFE copolymer 2 was 28.6 MPa, and the tensile elongation was 324%.

Example 3

The polymerization reactor used in Example 1 was deaerated, and 780 g of desalted water, 4.1 g of PPVE and 0.65 g of ammonium carbonate were charged. Then, the interior of the polymerization reactor was heated to 70° C. Chlorodifluoromethane was introduced until the pressure became 0.18 MPa/G, and then, TFE was introduced until the pressure became 1.0 MPa/G. 24 cm$^3$ of a 1 mass % aqueous solution of ammonium persulfate was charged as the polymerization initiator solution to initiate the polymerization. TFE was continuously charged to keep the pressure to be 1.0 MPa/G during the polymerization. After 5.6 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 120.7 g of a TFE copolymer 3 was obtained. The polymer composition was such that repeating units based on TFE/repeating units based on PPVE=98.9/1.1 (mass %). The melting point was 329° C., and the Q value was 1.3 mm$^3$/s. By press-molding the copolymer at 340° C., a white sheet having a thickness of 1 mm was obtained. The tensile strength of the TFE copolymer 3 was 24.0 MPa, and the tensile elongation was 321%.

Comparative Example 1

The polymerization reactor used in Example 1 was deaerated, and 780 g of desalted water, 4.1 g of PPVE and 0.65 g of ammonium carbonate, and 0.2 g of methanol were charged. Then, the interior of the polymerization reactor was heated to 70° C., and TFE was introduced until the pressure of the polymerization reactor became 1.0 MPa/G. 16 cm$^3$ of a 1 mass % aqueous solution of ammonium persulfate was charged as the polymerization initiator solution to initiate the polymerization. TFE was continuously charged to keep the pressure to be 1.0 MPa/G during the polymerization. The rate of the polymerization was slow. After 5.0 hours from the initiation of the polymerization, and at the time when 33 g of TFE was charged, the internal temperature of the polymerization reactor was lowered to room temperature, and at the same time, purging was carried out to atmospheric pressure.

The obtained powder was dried, and 30 g of a TFE copolymer 4 was obtained. The polymer composition was such that repeating units based on TFE/repeating units based on PPVE=99.2/0.8 (mass %). The melting point was 329° C., and the Q value was 0.59 mm$^3$/s. By press-molding the copolymer at 340° C., a sheet having a thickness of 1 mm was obtained, and the sheet was colored brown. The tensile strength of the TFE copolymer 4 was 8 MPa, and the tensile elongation was 45%.

Comparative Example 2

The polymerization reactor used in Example 1 was deaerated, and 780 g of desalted water, 4.1 g of PPVE and 0.65 g of ammonium carbonate were charged. Then, the interior of the polymerization reactor was heated to 70° C. Propane was introduced until the pressure became 0.03 MPa/G, and TFE was introduced until the pressure of the polymerization reactor became 1.0 MPa/G. 16 cm$^3$ of a 1 mass % aqueous solution of ammonium persulfate was charged as the polymerization initiator solution to initiate the polymerization. TFE was continuously charged to keep the pressure to be 1.0 MPa/G during the polymerization. After 8.7 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 128.2 g of a TFE copolymer 5 was obtained. The polymer composition was such that repeating units based on TFE/repeating units based on PPVE=99.0/1.0 (mass %). The melting point was 324° C., and the Q value was 177 mm³/s. By press-molding is the copolymer at 340° C., a sheet having a thickness of 1 mm was obtained. The sheet was very fragile, and when the sheet was punched by a micro dumbbell, the sheet was ruptured, and it was not possible to obtain a tensile test specimen.

Comparative Example 3

The polymerization reactor used in Example 1 was deaerated, and 780 g of desalted water, 4.1 g of PPVE, 0.65 g of ammonium carbonate and 0.08 g of n-hexane were charged. Then, the interior of: the polymerization reactor was heated to 70° C., and TFE was introduced until the pressure of the polymerization reactor became 1.0 MPa/G. 16 cm³ of a 1 mass % aqueous solution of ammonium persulfate was charged as the polymerization initiator to initiate the polymerization. TFE was continuously charged to keep the pressure to be 1.0 MPa/G during the polymerization. After 7.4 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 121.4 g of a TFE copolymer 6 was obtained. The polymer composition was such that repeating units based on TFE/repeating units based on PPVE=99.0/1.0 (mass %). The melting point was 325° C., and the Q value was 1.0 mm³/s. By press-molding the copolymer at 340° C., a sheet having a thickness of 1 mm was obtained, and the sheet was colored brown. The tensile strength of the TFE copolymer 6 was 4 MPa, and the tensile elongation was 26%.

Comparative Example 4

The polymerization reactor used in Example 1 was deaerated, 780 g of desalted water, 4.1 g of PPVE and 0.65 g of ammonium carbonate were charged, and the interior of the polymerization reactor was heated to 70° C. Then, TFE was introduced until the pressure of the polymerization reactor became 1.0 MPa/G. 16 cm³ of a 1 mass % aqueous solution of ammonium persulfate was charged as the polymerization initiator to initiate the polymerization. TFE was continuously charged to keep the pressure to be 1.0 MPa/G during the polymerization. After 3.5 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 125.0 g of a TFE copolymer 7 was obtained. The polymer composition was such that repeating units based on TFE/repeating units based on PPVE=98.7/1.3 (mass %). The melting point was 326° C. The TFE copolymer 7 could not be melted, and the Q value was 0 mm³/s. The copolymer was subjected to press-molding at 340° C., however, a sheet could not be obtained.

TABLE 1

|  | Ex. 1 | Ex. 2 | Ex. 3 | Comp. Ex. 1 | Comp. Ex. 2 | Comp. Ex. 3 | Comp. Ex. 4 |
| --- | --- | --- | --- | --- | --- | --- | --- |
| Chain transfer agent | Dichloromethane | Ethane | Chlorodifluoromethane | Methanol | Propane | Hexane | — |
| Polymerization time (hr) | 5.0 | 4.8 | 5.6 | 5.0 | 8.7 | 7.4 | 3.5 |
| PPVE reaction percentage (%) | 37.2 | 41.1 | 32.3 | 5.8 | 31.2 | 29.6 | 39.6 |
| TFE copolymer No. | 1 | 2 | 3 | 4 | 5 | 6 | 7 |
| Yield (g) | 127.3 | 120.4 | 120.7 | 30 | 128.2 | 121.4 | 125.0 |
| Content of PPVE repeating units (mass %) | 1.2 | 1.4 | 1.1 | 0.8 | 1.0 | 1.0 | 1.3 |
| Melting point (° C.) | 327 | 324 | 329 | 329 | 324 | 340 | 326 |
| Volume flow rate (mm²/sec) | 2.8 | 2.4 | 1.3 | 0.59 | 177 | 1.0 | 0 |
| Tensile strength (MPa) | 23.7 | 28.6 | 24.0 | 8 | — | 4 | — |
| Tensile elongation (%) | 319 | 324 | 321 | 45 | — | 26 | — |

Example 4

The polymerization reactor used in Example 1 was deaerated, and 780 g of desalted water, 4.3 g of PPVE, 0.65 g of ammonium carbonate and 1.9 g of dichloromethane were charged. Then, the interior of the polymerization reactor was heated to 70° C., and TFE was introduced until the pressure became 1.0 MPa/G. 20 cm³ of a 1 mass % aqueous solution of ammonium persulfate was charged as the polymerization initiator solution to initiate the polymerization. TFE was continuously charged to keep the pressure to be 1.0 MPa/G during the polymerization. After 5.17 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 126.3 g of a TFE copolymer 8 was obtained. The polymer composition was such that repeating units based on TFE/repeating units based on PPVE/repeating units=99.0/1.0 (mass %). The melting point was 328° C., and the Q value was 4.1 mm³/S. By press-molding the copolymer at 340° C., a white sheet having a thickness of 1 mm was obtained. The tensile strength of the TFE copolymer 8 was 18.9 MPa, and the tensile elongation was 277%.

Example 5

A TFE copolymer 9 was obtained in the same manner as in Example 4 except that 0.01 g (12.8 ppm based on the mass of the desalted water) of $F(CF_2)_2OCF_2CF_2OCF_2COONH_4$ (hereinafter referred to as APDO) was initially charged as an emulsifier. Table 2 shows the additive amount of APDO (ppm), the polymerization time, the reaction percentage of PPVE at the end of the polymerization, the yield of the TFE copolymer 10, the content of repeating units based on TFE, the content of repeating units based on PPVE, the melting point, the volume flow rate (Q value), the tensile strength and the tensile elongation.

Examples 6 to 11

TFE copolymers 10 to 15 were obtained in the same manner as in Example 5 except that the additive amount of APDO was changed. Table 2 shows the additive amount of APDO (ppm), the polymerization time, the reaction percentage of PPVE at the end of the polymerization, the yield of the TFE copolymers, the content of repeating units based on TFE, the content of repeating units based on PPVE, the melting point, the volume flow rate (Q value), the tensile strength and the tensile elongation.

TABLE 2

| | Ex. 4 | Ex. 5 | Ex. 6 | Ex. 7 |
| --- | --- | --- | --- | --- |
| Chain transfer agent | Dichloromethane | Dichloromethane | Dichloromethane | Dichloromethane |
| APDO (ppm) | 0 | 12.8 | 16.0 | 19.2 |
| Polymerization time (hr) | 5.17 | 4.28 | 3.89 | 3.95 |
| PPVE reaction percentage (%) | 29.4 | 32.3 | 35.1 | 46.6 |
| TFE copolymer No. | 8 | 9 | 10 | 11 |
| Yield (g) | 126.3 | 126.4 | 125.6 | 125.3 |
| Content of TFE repeating units (mass %) | 99.0 | 98.9 | 98.8 | 98.4 |
| Content of PPVE repeating units (mass %) | 1.0 | 1.1 | 1.2 | 1.6 |
| Melting point (° C.) | 328 | 328 | 328 | 329 |
| Volume flow rate (mm$^2$/sec) | 2.6 | 4.1 | 5.8 | 4.4 |
| Tensile strength (MPa) | 18.9 | 17.9 | 17.2 | 18.1 |
| Tensile elongation (%) | 287 | 278 | 262 | 248 |
| | Ex. 8 | Ex. 9 | Ex. 10 | Ex. 11 |
| Chain transfer agent | Dichloromethane | Dichloromethane | Dichloromethane | Dichloromethane |
| APDO (ppm) | 22.4 | 25.6 | 28.8 | 32.1 |
| Polymerization time (hr) | 3.51 | 3.39 | 3.37 | 3.48 |
| PPVE reaction percentage (%) | 39.8 | 38.0 | 40.3 | 28.6 |
| TFE copolymer No. | 12 | 13 | 14 | 15 |
| Yield (g) | 122.1 | 125.6 | 123.8 | 123.1 |
| Content of TFE repeating units (mass %) | 98.6 | 98.7 | 98.6 | 99.0 |
| Content of PPVE repeating units (mass %) | 1.4 | 1.3 | 1.4 | 1.0 |
| Melting point (° C.) | 330 | 327 | 328 | 329 |
| Volume flow rate (mm$^2$/sec) | 4.0 | 5.2 | 4.1 | 4.3 |
| Tensile strength (MPa) | 20.1 | 18.6 | 19.3 | 16.9 |
| Tensile elongation (%) | 314 | 255 | 307 | 243 |

Examples 12 to 15

TFE copolymers 16 to 19 were obtained in the same manner as in Example 5 except that instead of APDO, a predetermined amount of ammonium perfluorooctanoate (hereinafter referred to as "APFO") was used. Table 3 shows the additive amount of APFO (ppm) based on desalted water, the reaction percentage of PPVE at the end of the polymerization, the yield of the TFE copolymer, the content of repeating units based on TFE, the content of repeating units based on PPVE, the melting point, the volume flow rate (Q value), the tensile strength and the tensile elongation.

TABLE 3

|  | Ex. 12 | Ex. 13 | Ex. 14 | Ex. 15 |
|---|---|---|---|---|
| Chain transfer agent | Dichloromethane | Dichloromethane | Dichloromethane | Dichloromethane |
| APFO (ppm) | 1.0 | 3.8 | 14.4 | 64.1 |
| Polymerization time (hr) | 5.10 | 4.11 | 3.37 | 3.04 |
| PPVE reaction percentage (%) | 29.5 | 33.7 | 49.3 | 31.1 |
| TFE copolymer No. | 16 | 17 | 18 | 19 |
| Yield (g) | 126.9 | 120.8 | 124.8 | 121.7 |
| Content of TFE repeating units (mass %) | 99.0 | 98.8 | 98.3 | 98.9 |
| Content of PPVE repeating units (mass %) | 1.0 | 1.2 | 1.7 | 1.1 |
| Melting point (° C.) | 327 | 329 | 328 | 328 |
| Volume flow rate (mm$^3$/sec) | 3.1 | 4.2 | 4.6 | 6.8 |
| Tensile strength (MPa) | 17.4 | 19.8 | 19.1 | 17.5 |
| Tensile elongation (%) | 264 | 312 | 296 | 272 |

Example 16

The polymerization reactor used in Example 1 was deaerated, and 780 g of desalted water and 0.025 g (28.8 ppm based on the mass of the desalted water) of APDO as an emulsifier were initially charged, 5.1 g of PPVE and 0.65 g of ammonium carbonate were charged, and ethane was charged until the pressure became 0.02 MPa/G. Then, the interior of the polymerization reactor was heated to 70° C., and TFE was introduced Until the pressure of the polymerization reactor became 1.0 MPa/G. 25 cm$^3$ of a 1 mass % aqueous solution of ammonium persulfate was charged as the polymerization initiation solution to initiate the polymerization. TFE was continuously charged to keep the pressure to be 1.0 MPa/G during the polymerization. After 3.3 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 126.7 g of a TFE copolymer 20 was obtained. The polymer composition was such that repeating units based on TFE/repeating units based on PPVE=97.9/2.1 (mass %). The melting point was 326° C., and the Q value was 19.6 mm$^3$/s. By press-molding the copolymer at 340° C., a white sheet having a thickness of 1 mm was obtained. The tensile strength of the TFE copolymer 20 was 19.9 MPa, and the tensile elongation was 320%.

Example 17

The polymerization reactor used in Example 1 was deaerated, and 780 g of desalted water and 0.025 g (28.8 ppm based on the mass of the desalted water) of APDO as an emulsifier were initially charged, 6.6 g of PPVE and 0.65 g of ammonium carbonate wire charged, and ethane was charged until the pressure became 0.01 MPa/G. Then, the interior of the polymerization reactor was heated to 70° C., and TFE was introduced until the pressure of the polymerization reactor became 1.0 MPa/G. 29 cm$^3$ of a 1 mass % aqueous solution of ammonium persulfate was charged as the polymerization initiator solution to initiate the polymerization. TFE was continuously charged to keep the pressure to be 1.0 MPa/G during the polymerization. After 3.47 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 126.4 g of a TFE copolymer 21 was obtained. The polymer composition was such that repeating units based on TFE/repeating units based on PPVE=97.4/2.6 (mass %). The melting point was 327° C., and the Q value was 12.1 mm$^3$/s. By press-molding the copolymer at 340° C., a white sheet having a thickness of 1 mm was obtained. The tensile strength of the TFE copolymer 21 was 18.6 MPa, and the tensile elongation was 257%.

Comparative Example 5

The polymerization reactor used in Example 1 was deaerated, and 780 g of desalted water and 0.025 g (28.8 ppm based on the mass of the desalted water) of APDO as an emulsifier were initially charged, 10.6 g of PPVE and 0.7 g of ammonium carbonate were charged, and ethane was charged until the pressure became 0.01 MPa/G. Then, the interior of the polymerization reactor was heated to 70° C., TFE was introduced until the pressure of the polymerization reactor became 1.0 MPa/G. 53 cm$^3$ of a 1 mass % aqueous solution of ammonium persulfate was charged as the polymerization initiator solution to initiate the polymerization. TFE was continuously charged to keep the pressure to be 1.0 MPa/G during the polymerization. After 3.9 hours from the initiation of the polymerization, and at the time when 120 g of TFE was charged, the internal temperature of the polymerization reactor was lowered to room temperature, and at the same time, purging was carried out to atmospheric pressure.

The obtained powder was dried, and 125.0 g of a TFE copolymer 22 was obtained. The polymer composition was such that repeating units based on TFE/repeating units based on PPVE=97.1/2.9 (masse). The melting point was 316° C., and the Q value was 16.3 mm$^3$/s. By press-molding the copolymer at 340° C., a white sheet having a thickness of 1 mm was obtained. The tensile strength of the TFE copolymer 22 was 19.1 MPa, and the tensile elongation was 353%.

TABLE 4

|  | Ex. 16 | Ex. 17 | Comp. Ex. 5 |
|---|---|---|---|
| Chain transfer agent | Ethane | Ethane | Ethane |
| APDO (ppm) | 28.8 | 28.8 | 28.8 |
| Polymerization time (hr) | 3.3 | 3.47 | 3.9 |
| PPVE reaction percentage (%) | 52.1 | 49.8 | 34.2 |
| TFE copolymer No. | 20 | 21 | 22 |
| Yield (g) | 126.7 | 126.4 | 125.0 |
| Content of PPVE repeating units (mass %) | 2.1 | 2.6 | 2.9 |
| Melting point (° C.) | 326 | 327 | 318 |
| Volume flow rate (mm²/sec) | 19.6 | 12.1 | 16.3 |
| Tensile strength (MPa) | 19.9 | 18.6 | 19.1 |
| Tensile elongation (%) | 320 | 257 | 353 |

INDUSTRIAL APPLICABILITY

Since the TFE copolymer of the present invention is excellent in the heat resistance, the chemical resistance, the corrosive resistance, the oil resistance, the weather resistance, etc. and can be melt-molded, it is preferably used for applications of parts for automobiles, coating materials for electric wires, parts for industrial extrusion molding, containers for chemicals for process for producing semiconductors, joints, tubes, hoses for industry, hoses for foods, OA apparatuses, copying machines, precision parts of e.g. cell phones, or powder coating materials for lining.

The entire disclosure of Japanese Patent Application No. 2006-246041 filed on Sep. 11, 2006 including specification, claims and summary is incorporated herein by reference in its entirety.

What is claimed is:

1. A method for producing a melt-moldable tetrafluoroethylene copolymer comprising:
    radical suspension-polymerizing tetrafluoroethylene and perfluoro(alkyl vinyl ether) in an aqueous medium in the presence of
        a radical polymerization initiator,
        at least one chain transfer agent selected from the group consisting of methane, ethane, a hydrochlorocarbon, a hydrofluorocarbon and a hydrochlorofluorocarbon, and
        3 to 32.1 ppm of a fluoroemulsifier, based on the total mass of the aqueous medium,
    by charging the perfluoro(alkyl vinyl ether) all at once at the initiation of the polymerization, wherein
    said melt-moldable tetrafluoroethylene copolymer comprises repeating units (a) based on tetrafluoroethylene and repeating units (b) based on perfluoro(alkyl vinyl ether), wherein the amount of the repeating units (a) is from 97.4 to 99.5 mass % based on the total mass of the repeating units (a) and the repeating units (b), and the amount of the repeating units (b) is from 0.5 to 2.6 mass % based on the total mass of the repeating units (a) and the repeating units (b),
    the melting point of said melt-moldable tetrafluoroethylene copolymer is from 320 to 335° C., and
    the volume flow rate of said melt-moldable tetrafluoroethylene copolymer is from 0.1 to 1000 mm³/s.

2. The method for producing a melt-moldable tetrafluoroethylene copolymer according to claim 1, wherein said perfluoro(alkyl vinyl ether) is a perfluoro(propyl vinyl ether).

3. The method for producing a melt-moldable tetrafluoroethylene copolymer according to claim 1, wherein the chain transfer agent is a compound represented by the following formula (1):

$$C_nH_mCl_pF_{2n+2-m-p} \tag{1}$$

where n is an integer of 1 to 3, m is an integer of 1 to 6, p is 0 or an integer of 1 to 7, $m \leq 2n+2$, and $p \leq 2n+2-m$.

4. The method for producing a melt-moldable tetrafluoroethylene copolymer according to claim 1, wherein the chain transfer agent is dichloromethane, chlorodifluoromethane or ethane.

5. The method for producing a melt-moldable tetrafluoroethylene copolymer according to claim 1, wherein the amount of the chain transfer agent to be charged is from 0.0001 to 1 in the molar ratio, based on the total monomers charged at the initiation of the polymerization.

6. The method for producing a melt-moldable tetrafluoroethylene copolymer according to claim 1, wherein the radical polymerization initiator is a water-soluble radical polymerization initiator.

7. The method for producing a melt-moldable tetrafluoroethylene copolymer according to claim 6, wherein the water-soluble radical polymerization initiator is ammonium persulfate.

8. The method for producing a melt-moldable tetrafluoroethylene copolymer according to claim 1, wherein the fluoroemulsifier is ammonium perfluorooctanoate, ammonium perfluorohexanoate or $F(CF_2)_2OCF_2CF_2OCF_2COONH_4$.

9. The method for producing a melt-moldable tetrafluoroethylene copolymer according to claim 1, wherein the amount of said perfluoro(alkyl vinyl ether) to be used and present in the polymerization system at the initiation of the polymerization is from 1 to 6 mass % based on the tetrafluoroethylene copolymer to be formed.

10. The method for producing a melt-moldable tetrafluoroethylene copolymer according to claim 1, wherein the melting point of said melt-moldable tetrafluoroethylene copolymer is from 320 to 330° C.

11. The method for producing a melt-moldable tetrafluoroethylene copolymer according to claim 1, wherein the melting point of said melt-moldable tetrafluoroethylene copolymer is from 325 to 330° C.

12. The method for producing a melt-moldable tetrafluoroethylene copolymer according to claim 1, wherein the amount of the fluoroemulsifier, based on the total mass of the aqueous medium, is from 3 to 30 ppm.

13. The method for producing a melt-moldable tetrafluoroethylene copolymer according to claim 1, wherein the amount of the fluoroemulsifier, based on the total mass of the aqueous medium, is from 5 to 30 ppm.

14. The method for producing a melt-moldable tetrafluoroethylene copolymer according to claim 1, wherein the amount of the fluoroemulsifier, based on the total mass of the aqueous medium, is from 10 to 30 ppm.

* * * * *